United States Patent
Chung-Chih

(10) Patent No.: US 6,470,456 B1
(45) Date of Patent: Oct. 22, 2002

(54) METHOD AND SYSTEM FOR DYNAMICALLY CONTROLLING THE OPERATION SPEED OF A PROCESSOR

(75) Inventor: Tung Chung-Chih, Taipei (TW)

(73) Assignee: Mitac Technology Corp., Hsinchu (TW)

( * ) Notice: Subject to any disclaimer, the term of this patent is extended or adjusted under 35 U.S.C. 154(b) by 0 days.

(21) Appl. No.: 09/358,829

(22) Filed: Jul. 22, 1999

(30) Foreign Application Priority Data

Jul. 24, 1998 (TW) ........................................ 87112183 A

(51) Int. Cl.$^7$ ............................. G06F 1/32; G06F 1/08
(52) U.S. Cl. ..................... 713/322; 713/501; 713/502
(58) Field of Search .................................. 713/300, 320, 713/322, 600, 601, 500–502

(56) References Cited

U.S. PATENT DOCUMENTS 5,778,194 A * 7/1998 McCombs ................... 713/600
5,832,284 A * 11/1998 Michail et al. .............. 713/322

* cited by examiner

Primary Examiner—Thomas M. Heckler
(74) Attorney, Agent, or Firm—Darby & Darby

(57) ABSTRACT

A control method and system for dynamically modulating the operation speed of a processor is disclosed. First, a current utility ratio of the processor is determined by an occurrence frequency of idle signals sent from a program executed on the processor. Next, control the processor to work at an operating clock in direct proportion to the current utility ratio. Therefore, the purposes of power conservation and temperature reduction can be achieved through appropriately lowering the operation speed when the utility ratio of the processor is lower.

6 Claims, 3 Drawing Sheets

| Utilization Ratio of CPU (%) | Operation Clock of CPU (%) |
|---|---|
| 80-100% | 100% |
| 60-80% | 87.5% |
| 40-60% | 75% |
| 10-40% | 62.5% |
| 10% below | 37.5% |

FIG. 3

METHOD AND SYSTEM FOR DYNAMICALLY CONTROLLING THE OPERATION SPEED OF A PROCESSOR

BACKGROUND OF THE INVENTION

1. Field of the Invention

The present invention generally relates to a method and system for controlling processors. In particular, the present invention relates to a method and system for dynamically controlling the operation speed of a general-purpose processor so as to reduce power dissipation.

2. Description of Related Arts

To enhance the computation and processing performance of the central processing unit (CPU), a faster operation speed is required. Therefore, the operating frequency of general personal computers (PCs) has increased from 33 MHz, 66 MHz, to 200 MHz and beyond. Thus, there is a need to integrate a greater number of transistors in a single CPU chip. However, the progress of the CPU operation speed has raised several practical problems.

Commonly, current CPUs are confronted with two inter-related issues: one is power dissipation, and the other is temperature. More power is required since a greater number of transistors are integrated together into a single chip and operated at high operating frequency. On the other hand, more heat is exhausted from CPU, thus raising the environmental temperature. These are important concerns to be settled.

Typically, a CPU can be cooled by mounting a heat spreader or a fan cooler thereon. Another approach is provided by means of so-called "power management" to reduce the power dissipation and thus lower the temperature. But there are some disadvantages inherent to the "power management" approach. For example, if the user utilizes power management on a CPU to lower the operation speed, partial reduction of power dissipation and temperature may be carried into effect. However, the executing efficiency for all application programs being run is cut down at the same time.

SUMMARY OF THE INVENTION

It is therefore an object of the present invention to provide a method and system for dynamically controlling the operation speed of a processor while simultaneously maintaining the executing efficiency by monitoring the operation performance of a CPU, and the purpose of reducing power dissipation and temperature can be achieved.

In the present invention, a control method for dynamically modulating operation speed of a processor includes the following steps. First, determine the utility ratio of said processor by intercepting idle signals sent to application programs from an operating system (OS) being executed by a CPU. Measure an occurrence frequency of said idle signals statistically, said occurrence frequency being related to the current utility ratio of said processor. Based on said occurrence frequency, control the CPU to perform at a fitting speed in proportion to the utility ratio. When the CPU is in low utility ratio, the operation speed is lowered to reduce power dissipation and temperature.

In addition, a control system for dynamically modulating the operation speed of a processor with respect to the present invention is disclosed to execute a program, for example OS, able to send idle signals. The control system includes an intercepting module for intercepting idle signals from a program being executed and a statistic module coupled to said intercepting module for determining the utility ratio of said processor corresponding to the intercepted idle signals, wherein an occurrence frequency of idle signals is measured to reflect the current utility ratio and a control module is coupled to said statistic module for controlling said processor to perform at an operation speed in proportion to the utility ratio.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 3 shows a table representing a relation between the utility ratio range and the operating clock of a CPU.

DETAILED DESCRIPTION OF THE INVENTION

It is well known that a CPU is not always busy while being used. For example, when Microsoft Windows 95 is executed on a PC platform, the utility ratio of a CPU is under 10% during most of the operation time. A higher utility ratio of a CPU is applied only at that time when mass calculations and the heavy processing are needed; for example, to run engineering programs or specific software simulating an MPEG decoder for playing images and audio. In other words, the PC system is idle for the most of the operation time, but the CPU still runs at the highest speed.

By means of the method and system disclosed in the present invention, a work clock in a CPU can be dynamically adjusted in response to the actual utility ratio. Thus, if the utility ratio of CPU becomes low, the work clock in CPU may be slowed down accordingly. Application programs run better using the method of the present invention than while utilizing power management to lower the operation speed of a CPU. Furthermore, the purposes of power conservation and reducing temperature can be still achieved at the same time.

In this embodiment, Microsoft Windows 95 is applied as the operating system. However, it is not intended to be exhaustive or to limit the invention disclosed. For example, it can be applied to other computer or operating systems. Many modifications and variations will be apparent to practitioners skilled in the art.

Figure 1:
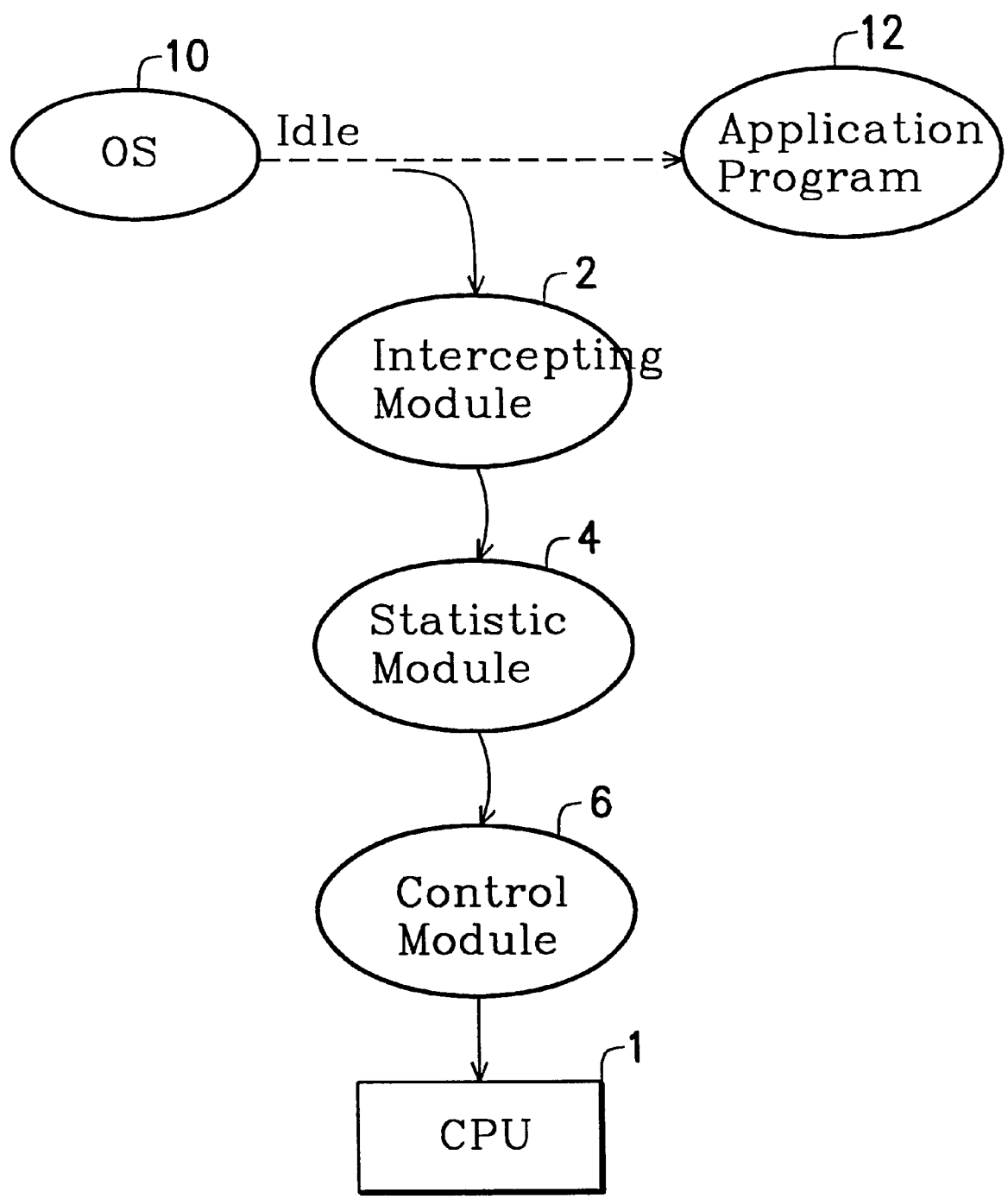
FIG. 1 is a structure diagram of a system for dynamically controlling the operation speed of a processor in accordance with one preferred embodiment of the present invention.

FIG. 1 shows a structure diagram of a system for dynamically controlling the operation speed of a processor in accordance with one preferred embodiment of the present invention. As shown in the structure, the control system includes an intercepting module 2, a statistic module 4, and a control module 6. As in the foregoing description, the operating system (OS) 10 run on CPU 1 in this embodiment is Microsoft Windows 95. Idle signals from Microsoft Windows 95 are delivered to other application programs 12 while CPU 1 is unoccupied. Hence, the operation speed of CPU 1 is modulated dynamically in response to these idle signals in this invention.

The intercepting module 2 is hooked to intercept each idle signal from OS 10. Actually the intercepting module 2 can be performed by a virtual machine device (VxD). After each idle signal is intercepted, it will be delivered to the statistic module 4.

The function of the statistic module 4 is to calculate an occurrence frequency of idle signals (for example, during a time interval of one second) sent out from OS 10 (or CPU 1). Based on the occurrence frequency, a current utility ratio of CPU 1 can be determined by the statistic module 4. Briefly, if the occurrence frequency is higher, the utility ratio of CPU 1 is lower. In addition, said time interval can be set and depends on different types of CPU or operation environments.

The control module 6 is coupled to the statistic module 4 for receiving the current utility ratio. Then by means of the current utility ratio, a fitting and active operation speed for CPU 1 can be generated. In brief, the control module 6 modulates CPU 1 to work at a lower operation speed in response to a lower utility ratio. At the same time, because of the lower utility ratio in CPU 1, the reduction of the operation speed does not affect the work efficiency of the whole PC system. On the other hand, if the utility ratio of CPU 1 is higher, the control module 6 can modulate CPU 1 to work at a higher operation speed to maintain the work efficiency of the whole PC system.

A task that the control module 6 fulfills is how to generate a dynamic operation speed. In general CPU structure, the operating clock is offered and controlled by core logic chipsets. Furthermore, the operating clock signal is originally generated from circuits on the motherboard (mainboard), and the operating clock is actually rectified by both of a selected base-frequency and a selected multi-frequency. For practitioners skilled in the art, the rectification of the operating clock can be processed by other methods.

Figure 2:
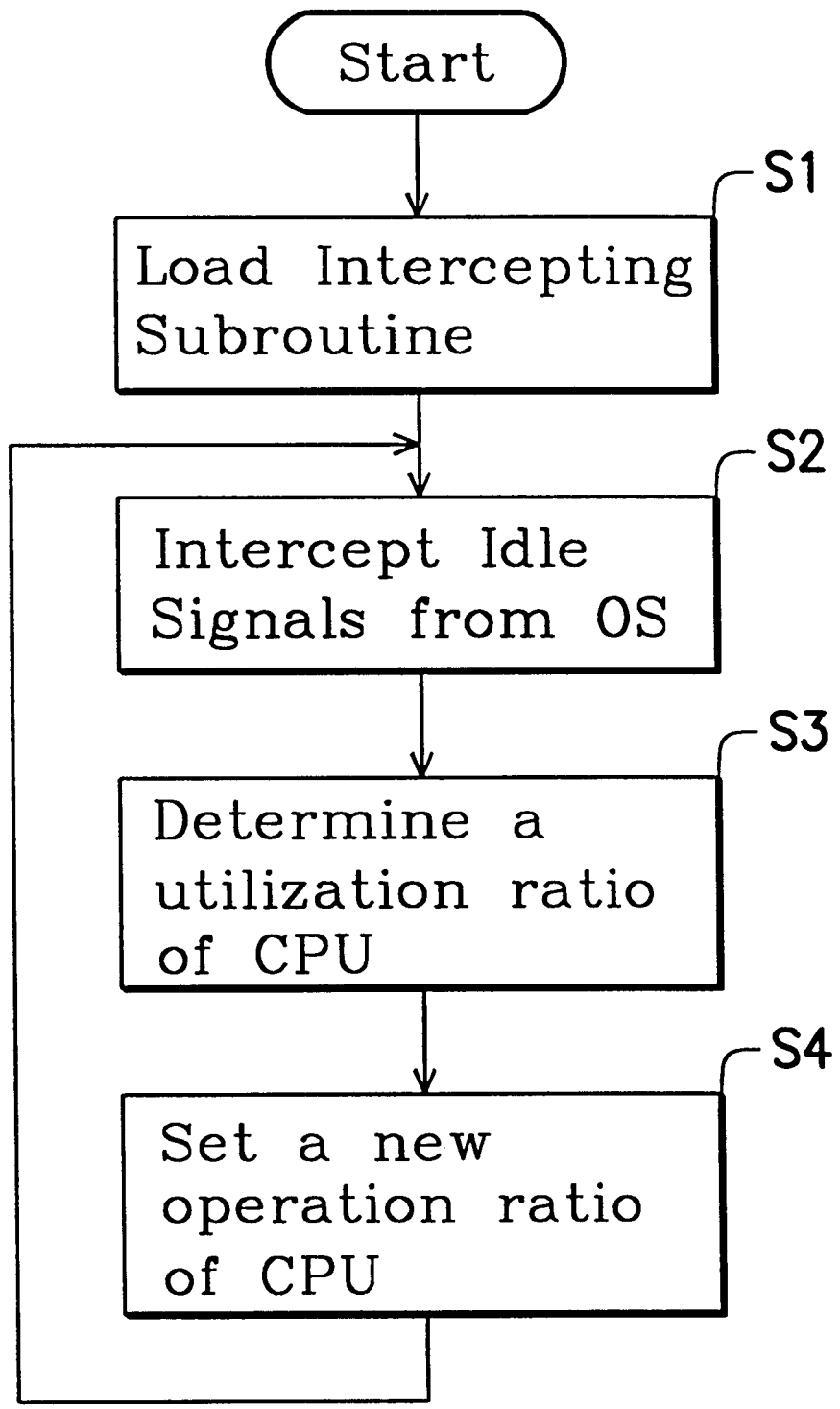
FIG. 2 is a flow diagram of a method for dynamically controlling the operation speed of a processor in accordance with the preferred embodiment of the present invention.

Referring to FIG. 2, an intercept subroutine is initially loaded into a control system with respect to the present invention, comprising an intercepting module 2, a statistic module 4, and control module 6 shown in FIG. 1 (step S1). Next, steps S2, S3, and S4 are processed sequentially and repeatedly. In step S2, idle signals from OS are intercepted by the intercepting module 2. A current utility ratio of the CPU may be measured and determined through an occurrence frequency of idle signals. Then a new operation speed corresponding to the utility ratio is set in step S4. By this control method, the operation speed of CPU 1 can be modulated dynamically in response to the real and active utility ratio to save power and reduce temperature.

The relationship between the utility ratio and operating clock of CPU is described as the follows. In FIG. 3, as in the foregoing description, the operating clock can be determined both by a selected base-frequency and a selected multi-frequency (a multiple of said selected base frequency) and the actual controllable operating clock is discontinuous. Therefore, each controllable operating clock is in response to one range of the utility ratio of CPU in this embodiment. As shown in FIG. 3, five ranges of the utility ratio of CPU are distinguished. When the current utility ratio of CPU is higher (for example, 80%–100%), the respectively highest operating clock (100%) will be set to maintain the work efficiency of the whole computer system. Inversely, when the current utility ratio of the CPU becomes lower(for example, below 10%), the said highest operating clock can be set lower (37%). In fact, because of the above relationship between the operating clock of the CPU and the utilization ration in this invention, the work efficiency of the whole computer system will not be reduced by a low utility ratio or a low operating clock of CPU. And by the method of this invention, both the purposes of power conservation and temperature reduction can be achieved.

The foregoing description of preferred embodiments of the present invention has been provided for the purposes of illustration and description. It is not intended to be exhaustive or to limit the invention to the precise forms disclosed. For example, it will be readily appreciated that another generating method of the operating clock of the CPU may be used. Many modifications and variations will be apparent to practitioners skilled in the art. The embodiments were chosen and described to best explain the principles of the invention and its practical application, thereby enabling others skilled in the art to understand the invention and to practice various other embodiments and make various modifications suited to the particular use contemplated. It is intended that the scope of the invention be defined by the following claims or their equivalents.

What is claimed is:

1. A method for dynamically controlling an operation speed of a processor, comprising:

determining a current utility ratio of said processor; and controlling said processor to operate at an operating frequency corresponding to said current utility ratio;

wherein said current utility ratio is positively correlative to said current utility ratio.

2. The method of claim 1, wherein said corresponding operating frequency is one of a plurality of preset operating clocks, each of which corresponds to a range of said utility ratio.

3. A system for dynamically controlling an operation speed of a processor, comprising:

an intercepting module for intercepting idle signals sent from a program being executed on said processor;

a statistic module connected to said intercepting module for determining a current utility ratio of said processor in response to a count of said idle signals; and a control module connected to said statistic module for controlling said processor to operate at an operating frequency corresponding to said current utility ratio;

wherein said current utility ratio is positively correlative to said current utility ratio.

4. The system of claim 3, wherein said program is an operating system (OS).

5. The system of claim 3, wherein said program being executed in said processor sends idle signals when said processor is idle.

6. The system of claim 3, wherein said -operating frequency is one of a plurality of preset operating clocks, each of which corresponds to a range of said utility ratio.

* * * * *